United States Patent
Bieth et al.

(10) Patent No.: US 8,169,961 B2
(45) Date of Patent: May 1, 2012

(54) METHOD FOR DYNAMICALLY ALLOCATING RESOURCES IN A NETWORK OF STATION CLUSTERS

(75) Inventors: Marc Bieth, Houilles (FR); Jean-Claude Thill, Fontenay Aux Roses (FR)

(73) Assignee: Thales (FR)

( * ) Notice: Subject to any disclaimer, the term of this patent is extended or adjusted under 35 U.S.C. 154(b) by 751 days.

(21) Appl. No.: 12/278,693

(22) PCT Filed: Feb. 6, 2007

(86) PCT No.: PCT/EP2007/051131
§ 371 (c)(1),
(2), (4) Date: Feb. 11, 2009

(87) PCT Pub. No.: WO2007/090839
PCT Pub. Date: Aug. 16, 2007

(65) Prior Publication Data
US 2009/0303957 A1    Dec. 10, 2009

(30) Foreign Application Priority Data
Feb. 7, 2006   (FR) .................................. 06 01078

(51) Int. Cl.
*H04W 4/00* (2009.01)
(52) U.S. Cl. ....................................... 370/329
(58) Field of Classification Search ........................ None
See application file for complete search history.

(56) References Cited

U.S. PATENT DOCUMENTS

| 2002/0167960 A1 | 11/2002 | Garcia-Luna-Aceves | |
| 2006/0165012 A1* | 7/2006 | Habetha | 370/254 |

OTHER PUBLICATIONS

J. Gronkvist, "Assignment Methods for Spatial Reuse TDMA."Swedish Defence Research Establishment Div. of Command and Control Warfare Tech., IEEE, 2000, pp. 119-124, XP002436771.
Tao, Wu, Subir Biswas, "A Self Reorganizing Slot Allocation Protocol for Multi Cluster Sensor Networks." Michigan State University, IEEE, 2005, pp. 309-316, XP002404232.
Chen, Yuh-Shyan et al. "An Overlapping Communication Protocol Using Improved Time Slot Leasing for Bluetooth WPANs." Department of Computer Science and Information Engineering, National Chung Cheng University, Taiwan, 2005, pp. 1-10, XP002436695.

(Continued)

*Primary Examiner* — Chirag Shah
*Assistant Examiner* — Otis L Thompson, Jr.
(74) *Attorney, Agent, or Firm* — Lowe Hauptman Ham & Berner, LLP

(57) ABSTRACT

A distributed method for dynamically assigning time-frequency resources in a network comprising several stations is disclosed. The stations are organized in groups (or interfaces) of several stations with each group comprising an allocation table Tsi. Each group exchanges this allocation table by means of a signaling protocol with groups that are defined as being in conflict with it by a constraints graph. The method uses an arbitration function to settle the conflicts and the assignments of allocations between the groups in conflict according to the constraints graph. In performing the method, each interface Ji transmits the allocation table TJi associated with it to the interfaces K indicated as being in conflict in the constraints graph. An interface Ji looks, for each allocation AJi that it has entered in its table TJi, whether the allocation AJi is used in the table received from an interface K that is in conflict. The interface Ji uses the arbitration function to modify the allocation AJi in the table TJi.

6 Claims, 3 Drawing Sheets

OTHER PUBLICATIONS

Tan, Godfrey et al. "A Locally Coordinated Scaternet Scheduling Algorithm." Proceedings of the 27th Annual IEEE Conference on Local Computer Networks, 2002, pp. 1-11, XP002436696.

SDTMA allocation by J. Grönkvist "Distributed STDMA in Ad hoc network" et "Interference-Based Scheduling in Spatial Reuse TDMA" J. Grönkvist Doctoral Thesis Stockholm, Sweden 2005.

HAMA, LAMA and NAMA protocols by Lichun Bao and J.J. Garcia-Luna-Aceves described in the publications "Channel Access Scheduling for Ad-Hoc Networks" Journal of Parallel and Distributed Computing, Special Issue on Wireless and Mobile Ad Hoc Networking and Computing, 2002 and "Distributed Channel Access Scheduling for Ad Hoc Networks".

M Gerla and C.R Lin in IEEE Commun. Sep. 97 "Adaptive clustering for mobile Wireless networks".

* cited by examiner

METHOD FOR DYNAMICALLY ALLOCATING RESOURCES IN A NETWORK OF STATION CLUSTERS

CROSS-REFERENCE TO RELATED APPLICATIONS

The present Application is based on International Application No. PCT/EP2007/051131, filed on Feb. 6, 2007, which in turn corresponds to French Application No. 0601078, filed on Feb. 7, 2008, and priority is hereby claimed under 35 USC §119 based on these applications. Each of these applications are hereby incorporated by reference in their entirety into the present application.

TECHNICAL FIELD

The present invention relates notably to a method and a system for dynamic allocation of time frequency resources in a radio network and also in ad hoc networks. It may be applied to STDMA (Spatial Time Division Multiple Access) systems.

BACKGROUND OF THE INVENTION

FIG. 1 shows a set of stations Si interconnected by a radio network where the resources are organized in time/frequency slots as shown in FIG. 2. In a given time slot and a given frequency some stations will transmit to some of their neighboring destination stations. For a given cycle, a logical channel C is allocated for a time slot K.

The problem posed is to allocate the slots and the frequencies to transmitter stations (and to a subset of their neighboring stations, called destination stations) in a distributed manner by best using the available resources, i.e. by allowing a maximum number of transmitters to use the same slot while conforming to the following rules:

a station is either a transmitter or a receiver;
if the station is a transmitter, then the destinations are receivers in the slot and the frequency of the transmitter, and a station may only be a receiver for a single channel and a single transmitter;
if the station is a receiver from a transmitter on a channel, there are no other stations neighboring this station that are a transmitter on the same channel apart from the transmitter being listened to.

It is also known to orthogonalize transmissions in a slot by using other types of transmission to the transmission at a given frequency, for example orthogonalized frequency jumps, CDMA (Code Division Multiple Access) codes.

The organization of transmissions in slots requires a synchronization function that is assumed to exist, for example the GPS system or any other time distribution system.

Various solutions are currently being proposed in the literature or in existing systems for the problem of allocation.

The situation with the most conventional allocation is that where the assignment of time-frequency allocations is carried out by a base station; the topology of the network is not necessarily star-shaped. This base station manages the assignments through requirements and priorities of the features of the stations.

This solution is adopted (partly or completely) by a majority of civilian protocols using TDMA (time division multiple access 802.16, 802.11 in directed mode etc.). For reasons of reactivity and robustness, it is only conceivable for multilink networks of a moderate extent.

In the families of solutions for ad hoc networks, various methods are found that can be adapted more or less to the topology and to the traffic demand.

The simplest systems have a first-level allocation that is predefined and assigned to groups of stations depending on predictable features of demand and deployment. Once this allocation has been assigned, there are rules for using this allocation in the group, these rules being able to accept collisions or arrange signaling to settle the conflicts.

To resolve situations in the networks with a large number of hops, many decentralized solutions have been proposed, only some of which are mentioned below.

A first family organizes the transmission in a reservation phase, which might be in contention, followed by a transmission phase. The reservation-transmission cycle is periodically repeated.

Another family of solutions consists in exchanging signaling on a particular resource called the preallocated or dynamically allocated signaling channel. This signaling enables the resources used by a station to be known and hence conflicts to be detected, and verification of whether a resource can be allocated, without frequently indicating how to arbitrate these conflicts or how to assign the allocations (except partly or in the framework of a preallocation).

Another family of solutions enables the absence of conflict to be guaranteed without for all that determining an allocation to the stations. It is based on signaling that allows a station to identify which stations are in conflict (this depending on the type of transmission envisaged, point to point (one station to a neighbor or an activation link), broadcast (one station to all its neighbors or an activation node). A pseudo-random method then allows it to be known, for a given slot at a station, whether the station wins the right to use the slot over competing stations. The method guarantees the absence of conflict but does not provide stations with deterministic knowledge of the slots it can use. In addition, in one sense it is sub-optimal, as some slots cannot be used due to the multi-hop character of the network and to various constraints between stations. This method is used in the 802.16 standard and in the HAMA, LAMA and NAMA protocols by Lichun Bao and J. J. Garcia-Luna-Aceves described in the publications "Channel Access Scheduling for Ad-Hoc Networks" Journal of Parallel and Distributed Computing, Special Issue on Wireless and Mobile Ad Hoc Networking and Computing, 2002 and "Distributed Channel Access Scheduling for Ad Hoc Networks", or again in the patent application US 2002/0167960.

Another family of solutions works on a preliminary network structure at two levels. For example, a distributed procedure for structuring the network in groups or clusters. These clusters receive a family allocation (of slots) and this allocation is dynamically managed in this cluster (reducing to a base station type management) and comes down to a centralized allocation. General rules are used for the allocation of clusters, for example assigning a frequency (a channel, a CDMA code) to a cluster such that interfering clusters have different frequencies. (For example M Gerla and C. R Lin In IEEE Commun. September 97 "Adaptive clustering for mobile Wireless networks"). However, such a solution has some limits. First of all, it is necessary to prestructure the allocations into independent groups to be able to allocate the clusters (here a group is the set of allocations at a frequency, but when there are few frequencies it is necessary to use time division). For the number of groups necessary depends on the topology. There lies a difficulty. Moreover, the demands between the clusters are not necessarily equivalent. The preallocation per group may lead to insufficiencies in one group and a lack in others. Finally, in the case of changing the clusterization, it is the set of allocations that are affected and hence requires a reallocation.

The last family of allocations mentioned is the SDTMA allocation by J. Grönkvist "Distributed STDMA in Ad hoc network" et "Interference-Based Scheduling in Spatial Reuse TDMA" J. Grönkvist Doctoral Thesis Stockholm, Sweden 2005. In this thesis the author describes a decentralized method for allocating nodes or links by negotiation and arbitration of conflicts between the stations. The arbitration takes account of the traffic through a priority function. Furthermore, the interference conditions between transmitters and receivers aims to take into account a more detailed interference model than the simple neighborhood used in the invention described below, the model being known to the person skilled in the art.

SUMMARY OF THE INVENTION

The invention relates to a distributed method for dynamically assigning resources organized in disjoint classes to groups comprising at least two stations, each group comprising an allocation table Tsi, each group exchanges this allocation table by means of a signaling protocol with groups that are defined as being in conflict with it by a constraints graph, a graph of constraints between the groups indicating for a given group A the groups that may not have allocations of the same class as the allocations of A (first kind of conflict between groups) and the groups that are not in the first kind of conflict with A but which, if they use different allocations from the same class as A, must use different allocations in this class to those used by A (second kind of conflict between groups), the method using an arbitration function to settle the conflicts and the assignments of allocations between the groups in conflict according to the constraints graph, and is characterized in that it comprises at least the following steps:

each interface Ji transmits the allocation table TJi associated with it to the interfaces K indicated as being in conflict in the constraints graph;

an interface Ji looks, for each allocation AJi that it has entered in its table TJi, whether the allocation AJi is used in the table received from an interface K that is in conflict; and the interface Ji uses the arbitration function to modify the allocation AJi in the table TJi.

The group of stations may form a radio-connected set and the constraints graph is determined by the radio neighborhood of the stations of each group and by potential transmission characteristics associated with the stations of the groups.

If an allocation is used according to the allocation tables by an interface K and an interface J, and if J observes that the interface K is winning according to the arbitration function, by deletion in the two allocation tables, and if the conflict is of the first kind, then J deletes, for example, the allocation Aji in the allocation table of the interface J.

If an allocation is used according to the allocation tables by an interface K and an interface J, and if J observes that the interface K is winning according to the arbitration function, by deletion in the two allocation tables, and if the conflict is of the second kind, then the time allocation AJi is preserved in the table TJi and the transmission channel is changed, if a channel exists where this allocation is without the second kind of conflict.

The interface J examines, for example, whether there are free allocations Ai not announced by the interfaces in conflict and assigns itself its allocations.

If an interface J determines an allocation An that it is not using and which J evaluates according to the arbitration function to be winning over every interface in conflict using this allocation (by adding the interface into its table and by deleting it in the tables of the interface in conflict), the new interface assigns the allocation An to itself.

It is possible to use a family of allocations comprising the following steps: if the interface J assigns to itself, recovers or deletes an allocation, it seeks, before examining other allocations to assign to itself, to recover or to delete the allocations K+n*DNSj where NDSj is a parameter of the interface J.

An arbitration function defined in the following manner is, for example, used: an interface being characterized by a request of the type C1j, C2j, Cmj, where Cmj represents an allocation number requested by the interface J with the priority m (the highest priorities being the lowest indices), set SL, $j=\Sigma_{i=1}^{i=L}Ci$, j and Lmax the smallest of the priorities considered, with L the index corresponding to the priority and J wins over K, NJ being the number of allocations of J and NK the number of allocations of K, if:

either (Sl,j<NJ<=Sl+1,j and Sh,k<NK<=Sh+1,k) and k>l or NK>Slmax,k or (Sl,j<NJ<=Sl+1,j and Sl,k<NK<=Sl+1,k) or (NK>Slmax,k and NJ>Slmax,j) and (NJ−Sl,j)/Cl+1,j< (NK−Sl,k)/Cl+1,k.

If (NJ−Sl,j)/Cl+1,j=(NK−Sl,k)/Cl+1,k there is equality.

The method according to the invention notably has the following advantages:

the allocation is stable, i.e. in the absence of a change in the network topology and demand, it converges towards a stable solution, and does so quickly, and it is able to detect the changes in allocation;

it is able to manage the existing priorities;

it allows time/frequency allocations to be assigned in a decentralized manner to groups of stations;

the resources are assigned quickly, possibly being in conflict. This enables divided use of these resources to be maintained through a HAMA technique while tending progressively towards exclusive use. The interfaces therefore have communications resources very quickly, possibly in conflict, without waiting on a relatively long process tending to assign them without conflict;

the method integrates the multichannel and generalizes the notion of allocation, beyond the simple notion of link or node allocation, to quasi-random groups.

The transmission time or "overhead" is limited, and consequently the exchanges of signaling between stations to settle the conflicts are limited in volume and localized in a neighborhood of stations concerned.

The solution proposed makes it possible to have dynamic allocation of groups and hence to effect allocation at two levels. The separation of an allocation technique into two levels enables greater reactivity, as the allocation inside a group can be centralized and rely on conventional techniques.

This method may be advantageously exploited in radio equipment for constituting networked communications systems that do not necessitate (ad hoc case), or which minimize, the preallocation/configuration actions to assign the resources.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The method according to the invention notably has the function of allocating time-frequency resources between several stations of a mobile, multi-hop ad hoc network in a decentralized manner by proposing a method to settle the previously mentioned conflicts in a distributed manner. "Distributed" is understood to be the fact that in normal operation there is no predefined station responsible for this allocation and that the allocation and the settlement of conflicts must be done locally. Moreover, the resources of the systems considered are limited and it is probable that in the case of network load many contradictory allocation requests are to be arbitrated.

Figure 1:
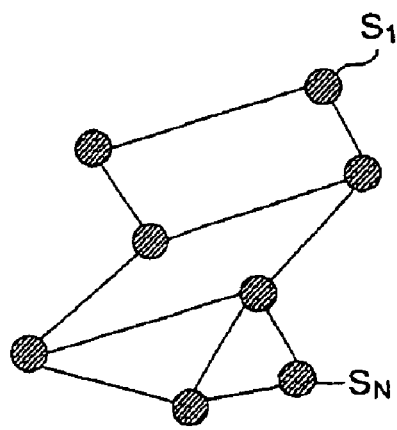
FIG. 1, a set of stations interconnected by a radio network or an ad hoc network.

The solution proposed enables the allocation of time-frequency resources to the stations Si of a mobile ad hoc network such as illustrated in FIG. 1.

The time is, for example, assumed to be divided into intervals, and assumes a synchronization of the network by any method of the GPS (Global Positioning System) type or any other method, the synchronization also possibly being ensured by signaling internal to the network. Moreover, several frequencies (channels) are available.

A given station may transmit or receive in one of these time or frequency slots, but the transmission and the reception cannot be done simultaneously. In its transmission or its reception in a given time slot, the station uses one and only one channel, this channel possibly being a frequency, a frequency evasion (EVF) sequence, a CDMA (Code Division Multiple Access) code or other techniques of orthogonalizing transmissions.

It is assumed that the transmission of a transmitter out of range of a station A (insufficient link quality) cannot be received by A, but in addition is not able to interfere with reception of this station A (transmission from another transmitter in range).

The method according to the invention is part of an architecture that assumes the prior existence of various functions, including a function defining groups of stations, called "interfaces" in the following, some examples of which are given, in a nonlimiting manner, in the remainder of the description.

One of the objects of the method is to allocate these interfaces, taking account of the constraints. Once these interfaces are allocated, the method may employ a second level of allocation depending on the nature of the interface, for example a "cluster" or a nonoriented link, which determines the allocations assigned to the interface using it. The internal allocation is known to the person skilled in the art.

The nature of the interface to be taken into account is described by knowing whether the stations involved in the interface are always transmitters or always receivers or sometimes one or the other. The internal allocation function does not have to be taken into account, which means that the allocation to the groups will have to be valid whatever internal allocation is made for a given slot.

Figure 3:
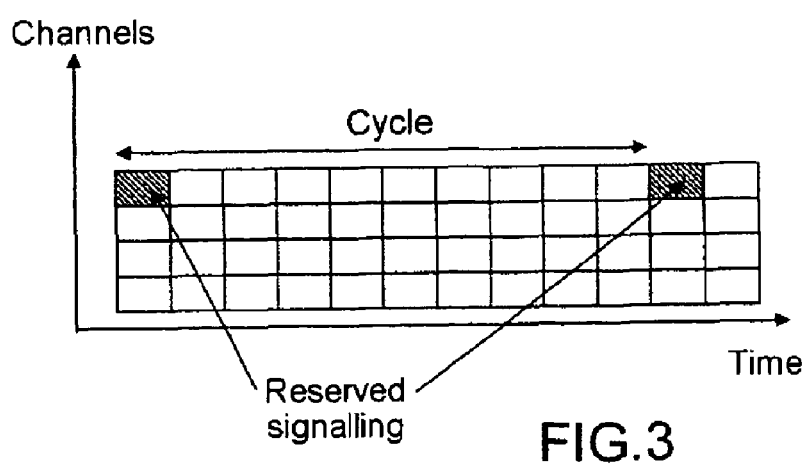
FIG. 3, an example of the structure of a transmission channel comprising slots reserved for transmission and slots assignable to the interfaces.

The method assumes the existence of a signaling ability between neighboring stations such that the allocations of an interface (group of stations) are known from the interfaces in potential conflict (the notion of conflict is explained below). The manner of assigning resources to this signaling is assumed to preexist and to be exempt from conflict. This may be preallocation or dynamic allocation of a part of the capacity intended for signaling such as illustrated in FIG. 3.

It is, however, necessary to be able to propagate the signaling to the stations of the interfaces concerned. By way of illustration, but in a nonexclusive manner, a method is described in the case in which the signaling is of a broadcast type and the interfaces constituted by a station and some (or even all) of its neighbors.

The interface Notion and the Constraints Graph

An interface has an internal mechanism allowing the stations to communicate with each other provided that a set of time/channel slots has been assigned to this interface.

One of the objects of the solution proposed is to assign these time/channel slots to these interfaces so that there is no contention between the various transmission interfaces.

Although the solution may be applied to interfaces of any nature, the example provided uses interfaces having a station called the main or central station and stations, called subordinate, neighboring in the radio direction of the main station.

This type of interface includes, for example, provided in a manner that is in no way limiting:
an oriented link (A to B), A being the main or central station;
a nonoriented link (A B), the main station being, by convention, that with the greatest address;
one station and a part, or even the totality, of its neighbors.

To characterize the transmissions from the interface, it is defined which stations may be transmitters and which are receivers.

Although it is possible a priori to conceive various situations at a practical level, the following will be limited to identical behavior of the subordinate stations. There will be, for example, the two following configurations:
transmitter main station, receiver subordinate stations;
transmitter and receiver main station and transmitter and receiver subordinate stations.

The constraints are then those of the model adopted from the ad hoc network:
Two interfaces with common or shared stations may not receive identical time slots whichever channel is used. Two such interfaces will be said to be in conflict of the first kind.
Two interfaces that are not in the first kind of conflict and which have, for one interface, a potential transmitter station in radio neighborhood of a potential receiver station in the other interface are said to be in conflict of the second kind. In this case they may have identical slots only if they use different channels in these slots.

Figure 4:
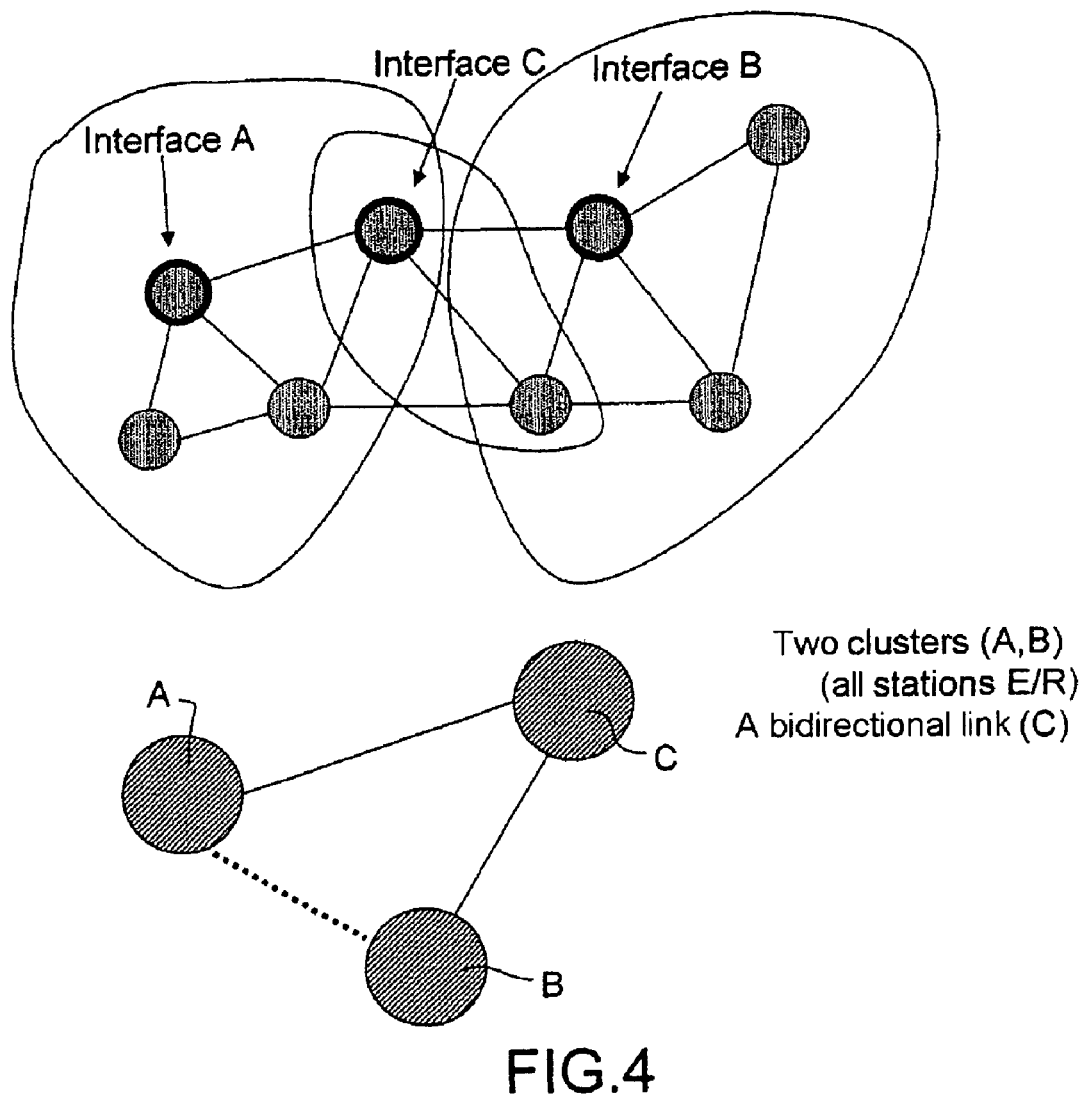
FIG. 4, a network structured in interfaces including two clusters and a bidirectional link.

These constraints are represented by a diagram drawn in FIG. 4, the tops of which correspond to the interfaces and the solid-line edges correspond to a conflict of the first kind and the dotted-line edges to a conflict of the second kind.

This diagram is obtained, for example, by knowing the interface stations, the transmission characteristics of these interfaces and the neighborhood of the stations. The possibilities for allocation depend only on this diagram and not on the nature of the interfaces. To obtain this knowledge, the following schema may be used: each station announces to its neighbors on the signaling channel:

the interfaces it belongs to, each interface is announced with its type and the nature of the announcing station: subordinate or base station;

the interfaces to which the neighboring stations belong;

the nature of the neighborhood of the interface, i.e. whether a station k has neighboring stations that are announcing an interface B to which they belong (and to which k does not belong), k announces whether it has a neighborhood of the subordinate type (at least one neighboring station is subordinate in B), base type (one neighbor is a base station), or both.

This first level of declarative signaling may be produced in various ways. It enables each base station to construct the constraints graph. This is because, for a given central station, the conflicts of the first kind are determined by the announcements from subordinate stations and from interfaces in which they are involved, and the conflicts of the second kind are determined by the announcements from neighboring interfaces of subordinate stations.

Physical Allocation and Logical Allocation. Arbitration Function

Figure 2:
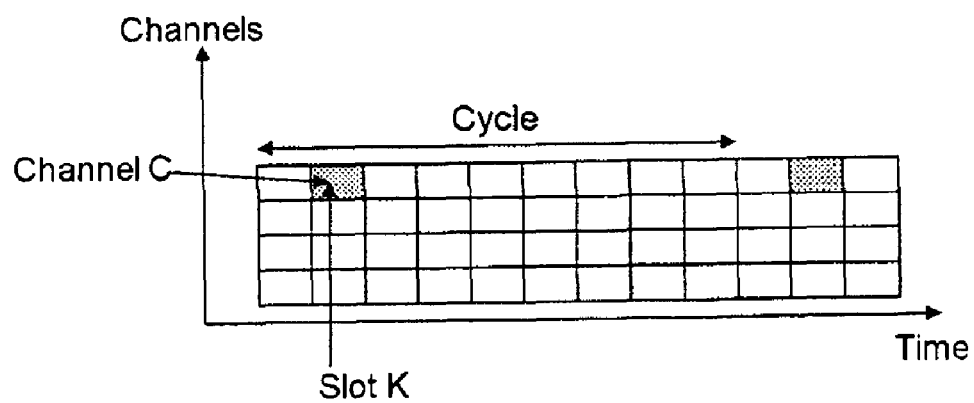
FIG. 2, a symbolic diagram of time/frequency resources.
Figure 5:
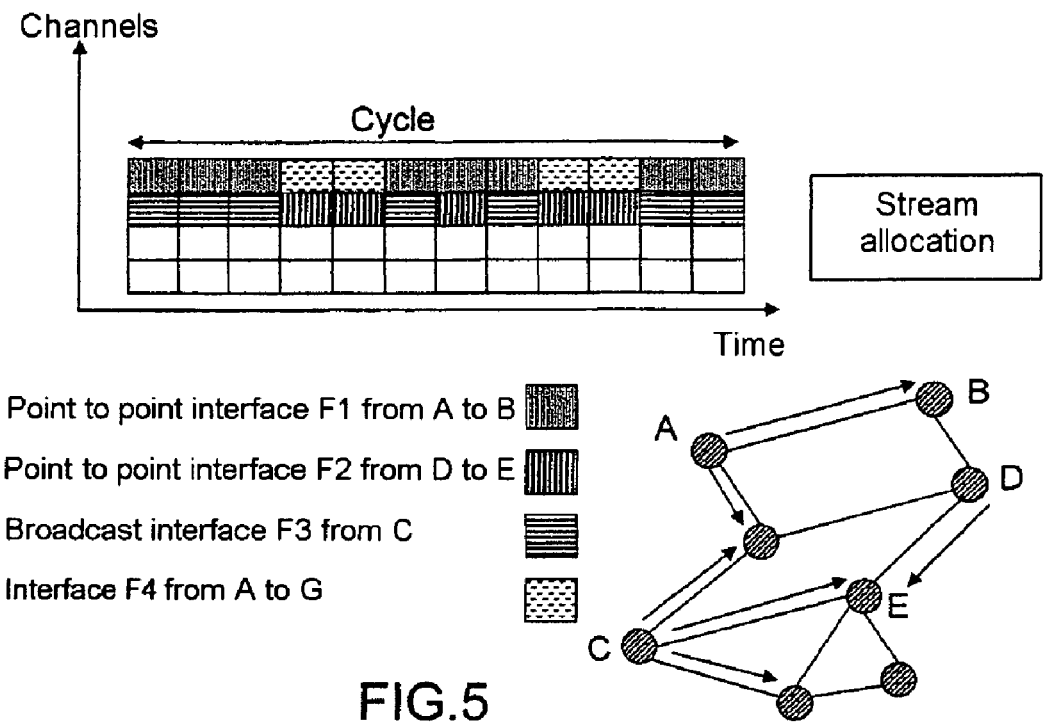
FIG. 5, a valid allocation for the network and the interfaces of FIG. 4.

One of the objects of the method according to the invention consists in assigning slots and channels on these slots to each interface group of stations in a decentralized manner, so as to obtain a solution without conflict such as illustrated in FIG. 5. This assignment is represented logically as a table of NSLOT columns for a cycle by C rows (cf. FIG. 2). Each column represents a logical time slot and each row a channel. An allocation for an interface will be represented by a value 1 in the column of the slot and the row of the channel, and otherwise a value 0. These allocations are then matched with the totality or a part of the physical slots (for example, the signaling slots are deleted in this matching). If the organization of the physical frame is changed, the assignment remains valid by modifying the matching, with the reservation that each station carries out the same operation. The representation in NSLOT slots assumes that the logical frame is repeated every NSLOT.

In the example provided it is assumed that NSLOT and C are the same for each interface.

As the assignments of slots and channels between interfaces on these slots are dynamic, conflicts will occur in the process of defining interfaces or as a consequence of changing neighborhoods, i.e. allocations will be made that do not conform to the constraints graph. Arbitration is therefore necessary to decide which of the interfaces the allocation will preserve or abandon. Similarly, once an assignment has been made, a new interface having been created, it will probably have to recover allocations to interfaces in conflict.

An arbitration function is introduced in such a way that these various mechanisms can be employed and lead to a stable solution. This arbitration function also allows, where necessary, the allocation to some interfaces to be favored, for example depending on the requirement of each interface.

This arbitration function may take very different forms according to the objective to be achieved. However, it must comply with the following rules:

The arbitration function notably enables an interface A to decide whether it wins, loses or is equal with an interface B solely from the number of allocations of the interface A and the number of allocations of interface B. This means that the allocations are mutually indiscernible.

If the interface A wins relative to B and B relative to C, then A wins relative to C.

If A wins or is equal relative to B, then A wins if the number of allocations of B is increased and/or if the allocations of A are reduced.

The number of allocations added or recovered is, for example, limited by a fixed parameter.

By way of nonlimiting example, the method uses the following arbitration function:

An interface is characterized by a request of the type $C1j$, $C2j$, $Cmj$, where $Cmj$ represents an allocation number requested by the interface J with the priority m (the highest priorities being the lowest indices). Set SL, $j = \sum_{i=1}^{i=L} ci, j$ and Lmax the smallest of the priorities considered. The letter L corresponds to the priority. Consider by way of example the following arbitration function:

J wins over K, NJ being the number of allocations of J and NK the number of allocations of K, if:

either $Sl,j < NJ <= Sl+1,j$ and $Sh,k < NK <= Sh+1,k$ and $k>l$ or $NK > Slmax,k$ or $(Sl,j < NJ <= Sl+1,j$ and $Sl,k < NK <= Sl+1,k)$ or $(NK > Slmax,k$ et $NJ > Slmax,j)$ and $(NJ-Sl,j)/Cl+1,j < (NK-Sl,k)/Cl+1,k$.

If $(NJ-Sl,j)/Cl+1,j = (NK-Sl,k)/Cl+1,k$ there is equality.

Figure 6:
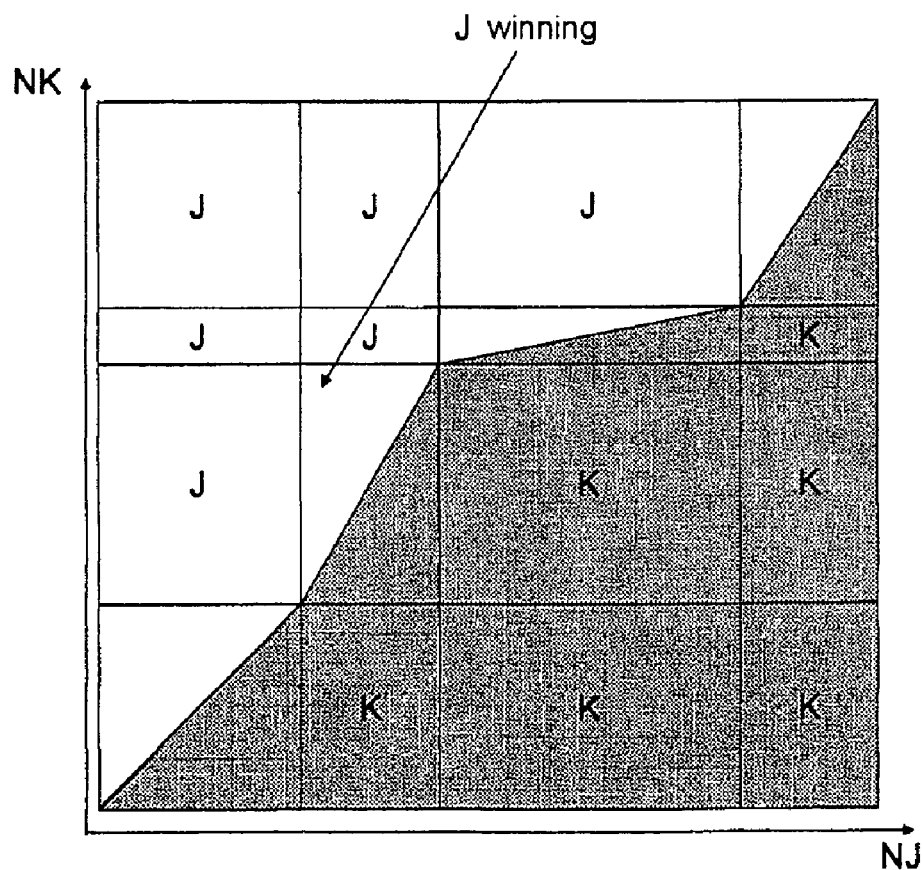
FIG. 6, a possible arbitration function to allow convergence of the method according to the invention.

This arbitration function is represented in FIG. 6.

Valid arbitration functions are obtained, for example, by replacing $(NJ-Sl,j)/Cl+1,j < (NK-Sl,k)/Cl+1,k$ by $NJ < NK$ (associated with $NJ=NK$ for equality) in all of part of the ranges $(Sl,j < NJ <= Sl+1,j$ and $Sl,k < NK <= Sl+1,k)$ or $(NK > Slmax,k$ and $NJ > Slmax,j)$.

This arbitration function enables the expressed requirement of the interfaces and the priority to be taken into account. These values $Cl,i$ do not depend on allocations and are announced by the signaling in the same way as the declaration of the interfaces. The method according to the invention assigns all the possible allocations even beyond the request, this being to limit blockage situations.

Principle of the Method According to the Invention

The method according to the invention may be summarized as a logical exchange between interfaces. An interface is, for example, materialized by its main station in a 1-cluster organization. An allocation is allocated not to a station but to an interface. To allow the solution to be better understood, a description will be made from an interface point of view, the materialization in the stations being a problem of implementation, an example of which will be given next.

Generally speaking, the allocations may be described in an abstract manner through a set of NLOC disjoint classes, each class comprising C allocations at most.

Each interface transmits to the interfaces indicated as being in conflict in the constraints graph (conflicts of the first or second kind), the table NLOC*C (allocation table) relating to it. The method assumes a more or less periodic exchange of allocation tables. Each interface then modifies its allocation table and re-transmits when it has received the allocation tables from the interfaces in conflict or on a time out. Practically speaking, these allocation tables will be transmitted on the signaling channel by the main station and relayed by a method such as that described by the sequel to the other main stations of the interfaces in conflict. This point allows the solution to be considered local, the exchanges taking place in the neighborhood of each main station.

Allocation by an Interface

In view of the allocation messages received, an interface will modify its allocations and re-transmit the new allocations that it assigns itself. These successive exchanges generally converge towards a solution. This convergence is ensured by the arbitration function and the manner of deleting the conflicts and recovering the allocations of one interface to the other, i.e. the Phases 1 and 3 of the assignment algorithm.

In order to modify its allocations before retransmitting its allocation table, an interface J will run an algorithm locally that is able to implement one or more of the three phases described below: namely the mechanisms for settling conflicts, for adding and for recovering allocations between interfaces.

Phase 1: Elimination of Allocations in Conflict.

This phase is characterized by a decision based on the arbitration function. To do this, an interface J looks, for each allocation that it has recorded in its table, whether the allocation is used in the table received from another interface K which is in conflict with it. By using an arbitration function, the interface J decides to modify or to delete the allocation of its table if it is used by a winning interface. The elimination continues as long as there are allocations are in conflict with interfaces K that the arbitration function provides as winning (the arbitration function is dependent on the number of allocations, it is evaluated by deleting the allocation in conflict in the two interfaces). In the case of equality the station address is used as complementary arbitration for this phase.

If the winning interface K is in conflict of the first kind, the allocation in J is deleted.

If the conflict is of the second kind, it is possible to try, instead of the preceding deletion, to keep the allocation class and change the allocation within the class, if there is an allocation of this class, deleting any conflict on this allocation or having conflicts only with losing interfaces. If this allocation does not exist, the initial allocation is deleted.

The allocation table of J is hence modified locally and it is this table which is used in the successive steps of the algorithm. As the arbitration function tends to provide winning J when allocations are deleted, there is a limitation in the number of deletions by J. The following Phases 2 and 3 may not be carried out in the case of deletion.

Phase 2: Assignment of Free Allocations

The interface J examines whether there are free allocations, i.e. allocations not announced by the interfaces K in conflict. The interface J then assigns these allocations to itself.

The arbitration function does not intervene in this Phase 2. In fact, a winning interface in conflict may not be able to assign itself these allocations, which hence remain unused. It is important to be able to allocate all the allocations to limit blockages.

To limit the simultaneous assignment of the same allocations by interfaces in conflict, which slows the convergence time, it is possible to use a configuration parameter to restrict the number of allocations assigned in this phase of the algorithm by using the number of iterations of this phase. In this case, it is not necessary to run Phase 3 if Phase 2 has attributed the authorized number of allocations.

Phase 3: Recovery Phase

A newly created interface will find all the already assigned allocations. It is therefore necessary to be able to recover them, doing so under the control of the arbitration function.

This phase complements Phase 1 and the consistency of these two phases enables the convergence. In fact, recovered allocations are naturally in conflict. The consistency in the employment of the arbitration function between the Phases 1 and 3 leads (at least if there are no other changes in the allocations), where a station has decided to recover an allocation depending on the rules of Phase 3 and hence to assign it to itself, the station that had the allocation to delete it from its table depending on the rules of Phase 1. If an interface does not have an allocation, is winning or is in equality, through the arbitration function, in comparison with all the other conflicting interfaces having this allocation (the arbitration function being evaluated by adding the allocation in the interface and by deleting it in the conflicting interfaces), it assigns this allocation, thus creating a conflict that will be resolved when the other interfaces carry out Phase 1. To be more precise, it is necessary to check the arbitration condition for all the interfaces in the first kind of conflict, which leads to selection of "recoverable" allocation classes. For conflicts of the second kind, it is checked that there is an allocation in the "recoverable" classes where the interfaces which use this allocation are losing with respect to the arbitration function. A stricter policy is to prohibit the recovery if an interface is in the second kind of conflict is using the allocation, this being done in a manner independent of the arbitration function.

As for Phase 2, a parameter may be used to limit the number of iterations during this phase of the algorithm and to accelerate the convergence. In this phase a recovered allocation is written into the table of J. It is provisionally deleted from the tables of the other interfaces in conflict in this allocation. This leads to the interfaces where the allocations are potentially deleted to be made winning for the arbitration function and losing for the interface J, thus naturally limiting the number of recoveries.

Use of a Notion of an Allocation Family in the Preceding Phases

According to one embodiment, it is possible to integrate an optional mechanism that enables, in the Phases 1, 2 or 3, a deletion, an addition or a recovery that has been decided on, to attempt to delete, add or recover an allocation family linked with this allocation. This mechanism allows the convergences to be accelerated by acting in this way on several allocations.

To do this, each interface J examines the allocation of its table from a starting allocation specific to it (by configuration or randomly determined but fixed).

If the interface J assigns to itself or recovers an allocation K, before examining other allocations it will immediately attempt to assign to itself or to recover the allocations $K+n*DNSj$, where DNSj is a parameter specific to the station J (possibly being fixed by configuration, or dynamically defined as indicated in the following in a detailed example of the solution). If J decides on an action in the allocation A, it will attempt the same action on $A+DNSj$, thus assigning the allocations by distributed family, for example if the interface assigns itself the allocation 1 and if $DNSj=4$, the interface looks as a matter of priority whether it can assign itself the allocation 5, 9, 13 etc. before looking at the allocation 2. For each of these potential allocations, the criteria of Phase 2 or 3 are checked.

The aim is, in the context where the allocations are for example of the time-frequency type, to process several time slots and to have not to process NSLOT allocations one by one, but DNSj allocations, which enables a significant reduction in convergence time. For reasons of consistency, this mechanism also intervenes in Phase 1 where, if necessary, the conflicts on the allocations $K+n*DNSJ$ will be deleted, if the deletion of K has been decided on. The arbitration function is normally taken into account for these deletions. However, to accelerate convergence when the percentage of allocations in conflict is high, it is not possible to take account of the arbitration function for these allocations, which might lead to more deletions than is necessary, but subsequently recovered.

Exemplary Implementation of the Attribution Algorithm

This paragraph describes in a detailed manner a possible implementation of the steps and the phases previously set out.

The input data are NSLOT (number of time slots to be allocated), C (number of channels), the various allocation tables (TK for the interface K).

The algorithm is run by each interface Ji to modify its table after receiving interface tables Tji in conflict, defined by the constraints graph.

The parameter DNSJ0, which determines a pseudo cycle of examining allocations (allocation family), and the parameter INDJ0 are associated with the interface J0. The parameter INDJ0 determines the first allocation examined in the algorithm for J0. These two parameters (different or not from one interface to another) may be fixed by configuration for a given system (for example, DNSJ0=NSLOT/10, INDJ0=1). If NCONF=1+the number of interfaces in the first kind of conflict with J0, it is also possible to choose dynamically DNSJ0=NCONF (if DNSJ0>NSLOT/10) and INDJ0=a random number between 1 and NCONF (but fixed in so far as NCONF does not change). These values are provided by way of indication but are not very decisive.

Another parameter controls the algorithm Valeur and limits the number of iterations of Phases 2 and 3.

By default Valeur=1

Note that $F(J0)>F(K)$ if the interface J0 wins over the interface K through the arbitration function and $F(J0)=F(K)$ if there is equality.

J0 and K are numbers identifying the interfaces and are different from one interface to another.

The algorithm is run for J0 before transmission of its allocation table TJ0. An allocation in the time slot "s" and the channel "ci" is denoted "s, ci".

Phase 1

Conflict of the first kind:

s=INDJ0, first time allocation examined

A—for each interface K in conflict of the first kind with J0

If s belongs to J0 and s belongs to K with $F(K)>F(J0)$ or $F(K)=F(J0)$ and K>J0

(F being evaluated by deleting an allocation in J0 and K) hence

Deletion of s from the table of J0.

Set s =s+1 and return to A if not all the allocations have been covered.

Note: The table TJ0 used at each iteration of A is the table updated by the deletions. Hence F(J0) increases (tends to become winning) at each deletion, and hence limits the number of deletions.

Conflict of the Second Kind (the Table TJ0 is the Updated Table)

The method is identical to the preceding method. The difference is that instead of a deletion it is possible to change the channel. Two types of method might be used according to the number C of available channels. If C is low (2 to 3), in the case of conflict, the allocation is deleted (hence identical to the preceding method). Otherwise an attempt is made to change the channel by looking for a channel ci that is free at the time allocation s (or s'), that is to say that the allocation s,ci is not used by any interface in conflict (or another variant by allocations losing through the arbitration function). If this is not possible, the allocation is deleted.

When an allocation is deleted (of the first or second kind), immediately after its deletion and before examining the allocations s+1 the allocation family s'=s+n*DNSJ0 is deleted. Run through all the allocations s'=s+n*DNSJ0 (modulo NSLOT) (with n<=NSLOT/DNSJ0) and delete/modify s', as for s.

If the percentage of slots in conflict is high, it is possible to delete s', if s' is in conflict with K, without checking the arbitration function.

Setting val=Valeur

If allocations have been deleted in Phase 1 the Phases 2 and 3 (option) are not executed.

Phase 2 s=INDJ0

B—it is checked whether s,ci is allocatable. Provided that s,ci is allocatable, it is necessary that s is not used by any interface in the first kind of conflict and that there is a channel ci such that s,ci is an allocation which is not used by any interface in the second kind of conflict. S must be free in J0.

If s,ci is allocatable, the allocation is written to TJ0. Set Val=Val−1. Run through all the allocations s'=s+n*DNSJ0 (modulo NSLOT) (with n<=NSLOT/DNSJ0) and allocate s',ck if this allocation is allocatable. Set Val=Val−1 at each assigned allocation.

Return to B with s=s+1 and in so far as all the slots s have not been covered and Val>0.

Phase 3

If Val>0 Phase 3 is applied s=INDJ0

C—it is checked whether s,ci is recoverable.

s,ci is said to be recoverable if:

s is not in the allocations of J0 if s is used by an interface K that is in the first kind of conflict, then $F(J0)>=F(K)$, F being evaluated by adding an allocation in J0 and by deleting one in K.

s,ci is not used by any interface in the second kind of conflict (case where the number of channels is low)

If s is recoverable, add s in TJ0 and set Val=Val−1. Run through all the allocations s'=s+n*DNSJ0 (modulo NSLOT) (with n<=NSLOT/DNSJ0) and allocate s',ck if this allocation is recoverable. Set Val =Val−1 at each assigned allocation.

For each recovered allocation, add it in TJ0 and fictively delete them in the tables Tk in the case of conflict.

Return to C with s=s+1 and in so far all the slots s have not been covered and Val>0.

During the running of the algorithm, and in so far as there is no convergence, it is possible to use the allocations in conflict by using a technique of the HAMA type (Lichun Bao and J. J. Garcia-Luna-Aceves).

It should be noted that if an allocation is no longer used by an interface, and this information is not known, HAMA techniques will not create conflict. Conversely, if an interface assigns a new allocation to itself, it will be necessary to check that the information is known before taking part in the HAMA competition.

Example of the Exchange Method and Implementation

Here an example of the exchange of signaling is described for an implementation of the proposed solution. It is assumed that a signaling channel exists enabling each station to broadcast signaling data to its radio neighbors.

It is assumed that each station that is a main station of at least one interface forms a signaling message. This message indicates, for each interface where the station considered is a main station, the allocations of this interface in the form of a table NSLOT*C whether the interface is used or not with 1 or 0. Note that such a table is associated with each interface (and not associated with the base station).

Each interface may be identified uniquely by the address of the main station and a number assigned by the latter.

It is assumed here that the exchanges consists of this single message. Obviously, to save bandwidth, it is possible to use messages proceeding by transmitting differences rather than transmitting all the data from all the interfaces. When an interface is no longer modified, it can be limited to the transmission of a signature. In this case, it is necessary to provide mechanisms to request data transmission from an interface in the case of inconsistencies. It is also possible for a station to create a message only for part, or even a single one, of its interfaces where it is the main station. These messages are called allocation messages, to be distinguished from other messages, not considered here, which are, for example, the previously mentioned declaration messages.

Using the declaration messages from interfaces, a base station adjusts the list L0 of interfaces in conflict. It eliminates from L0 the interfaces of which it is the main station and those neighboring the main station, thus constituting the list L1.

When the base station transmits the allocation message, this is received from subordinate stations in the interface and by the neighboring base stations. Hence, only the main stations of the list L1 do not directly receive this message.

It is assumed that each station knows the list of neighbors and of neighbors of neighbors.

The base station forms the list A of neighboring stations that are involved in an interface of the list L1 or neighboring a station involved in the list L1.

Let B be the list of neighbors of A that are not neighbors of the base station.

The list of relays designated by the base station is a subset C of A, such that each station from B is the neighbor of at least one station from C. The list L1 is transmitted to these relays.

The message transmitted by a main station comprises a relay indicator with the value 0.

A station that receives an allocation message with a relay indicator 0 from a base station SC, relays the message if it has been designated as a relay station by SC1 and if the message relates to an interface from L1. The relayed message is marked with a relay indicator 1.

A station that has been designated a relay by a main station SC2 and receives a message with a relay indicator 1 not originating from SC2, but from a main or principal station SC1 that has not been designated as a relay, retransmits the message in the following conditions:

The message relates to an interface from the list L1 provided by SC2. SC2 does not have neighboring stations involved in the interface affected by the allocation.

In these conditions, an allocation message from a main station reaches every base station from an interface in conflict.

The preceding algorithm is executed by each main station for the interfaces that relate to it.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A distributed method for dynamically assigning resources organized in disjoint classes to groups comprising at least two stations, each group including an allocation table Tsi, each group exchanges the allocation table by a signaling protocol with the groups that are defined as being in conflict with it by a constraints graph, a graph of constraints between the groups indicating for a given group A the groups that may not have allocations of the same class as the allocations of A (first kind of conflict between groups) and the groups that are not in the first kind of conflict with A but which, if they use allocations from the same class as A, must use different allocations in this class to those used by A (second kind of conflict between groups), the method using an arbitration function to settle the conflicts and the assignments of allocations between the groups in conflict according to the constraints graph, comprising the following steps:

each interface Ji transmits the allocation table TJi associated with the interface Ji to interfaces K indicated as being in conflict in the constraints graph;

an interface Ji looks, for each allocation AJi that it has entered in its table TJi, whether the allocation AJi is used in the table received from an interface K that is in conflict; and the interface Ji uses the arbitration function to modify the allocation AJi in the table TJi, wherein if an allocation is used according to the allocation tables by an interface K and an interface J, and if J observes that the interface K is winning according to the arbitration function, by deletion in the two allocation tables, the allocation is deleted in the table TJi if the conflict is of the first kind and if the conflict is of the second kind, then the class of the allocation AJi is preserved in the table TJi and the allocation in the class is changed, if there is an allocation in this class without the second kind of conflict, otherwise this allocation is deleted.

2. The method as claimed in claim 1, wherein the interface J examines whether there are free allocations Ai not announced by the interfaces in conflict and assigns itself its allocations.

3. The method as claimed in claim 1, wherein if, an interface J determines an allocation an that it is not using and which J evaluates according to the arbitration function to be winning over every interface in conflict using the allocation, by adding the interface into a table thereof and by deleting the interface in the tables of the interfaces in conflict, a new interface assigns the allocation An to itself.

4. The method as claimed in claim 1, wherein the number of allocations added or recovered is limited by a parameter.

5. The method as claimed in claim 1, wherein a family of allocations is used comprising the following steps: if the interface J assigns to itself, recovering or deleting an allocation, the interface J seeks, before examining other allocations to assign to itself, to recover or to delete the allocations K+n*DNSj where NDSj is a parameter of the interface J.

6. The method as claimed in claim 1, wherein an arbitration function defined in the following manner is used: an interface being characterized by a request of a type $C1j, C2j, Cmj$, where Cmj represents an allocation number requested by the interface J with a priority m (the highest priorities being the lowest indices), set $Sl,j=\Sigma_{i=1}^{i=L}Ci,j$, a time slot S and Lmax the smallest of the priorities considered, with L an index corresponding to the priority and J wins over K, NJ being the number of allocations of J and NK the number of allocations of K, if:

either $Sl,j<NJ<=Sl+1,j$ and $Sh,k<NK<=Sh+1,k$ and $k>1$ or $NK>Slmax,k$ or $(Sl,j<NJ<=Sl+1,j$ and $Sl,k<NK<=Sl+1,k)$ or $(NK>Slmax,k$ and $NJ>Slmax,j)$ and $(NJ-Sl,j)/Cl+1,j<(NK-Sl,k)/Cl+1,k$ If $(NJ-Sl,j)/Cl+1,j=(NK-Sl,k)/Cl+1,k$ there is equality.

* * * * *